(No Model.)
H. B. COOLEY, J. M. NOBLE & J. E. TREVOR.
AUTOMATIC GUM FEEDING DEVICE.
No. 541,654. Patented June 25, 1895.
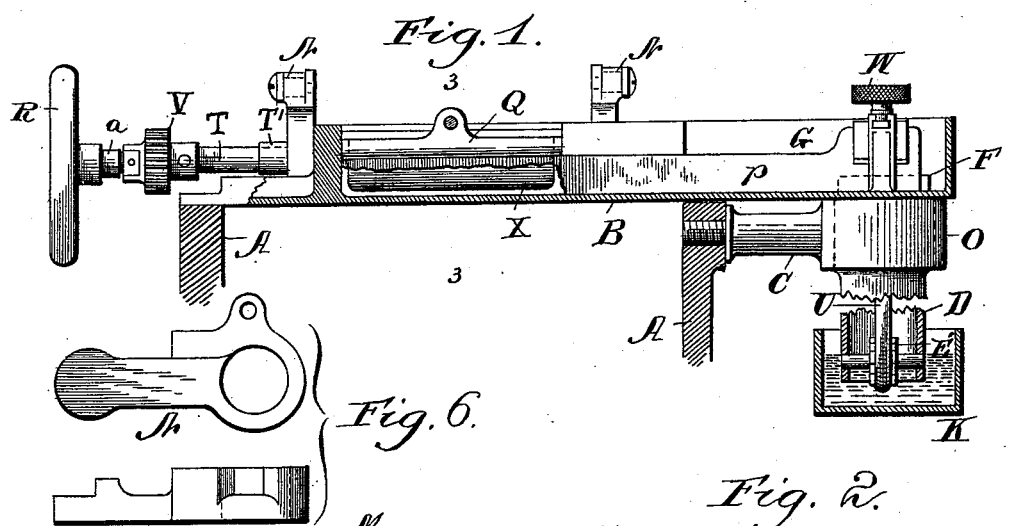
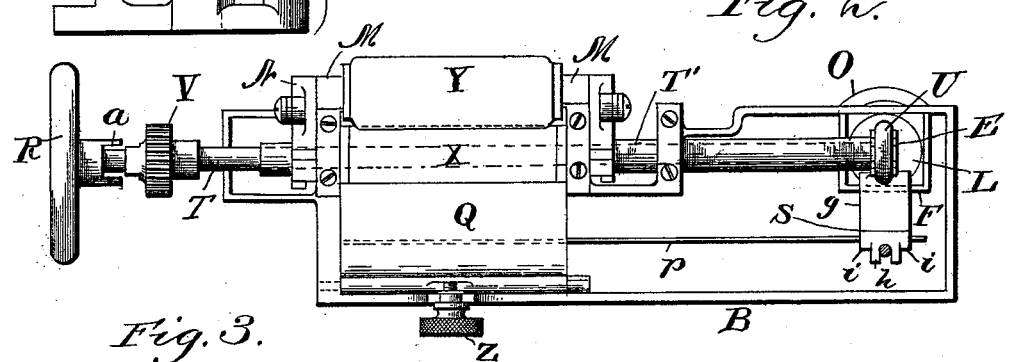
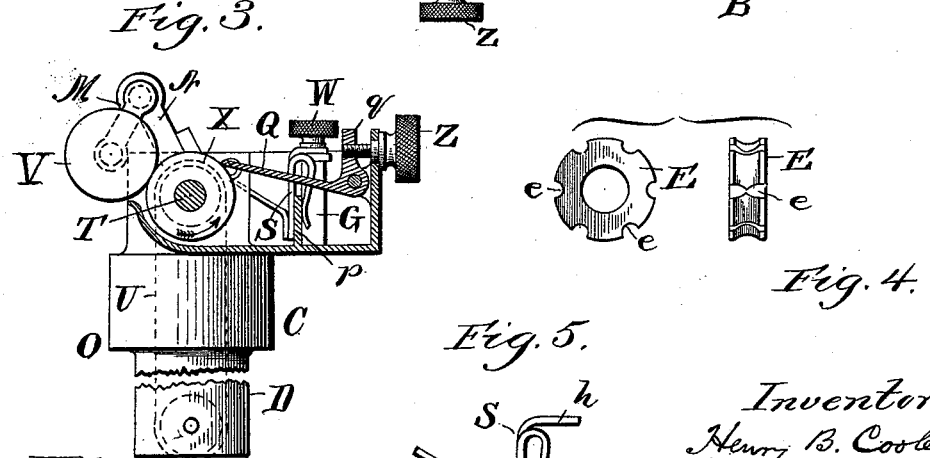

UNITED STATES PATENT OFFICE.

HENRY B. COOLEY, JOHN M. NOBLE, AND JAMES E. TREVOR, OF HARTFORD, CONNECTICUT.

AUTOMATIC GUM-FEEDING DEVICE.

SPECIFICATION forming part of Letters Patent No. 541,654, dated June 25, 1895.

Application filed September 17, 1894. Serial No. 523,203. (No model.)

*To all whom it may concern:*

Be it known that we, HENRY B. COOLEY and JOHN M. NOBLE, citizens of the United States, and JAMES E. TREVOR, a subject of the Queen of Great Britain and Ireland, residing at Hartford, in the county of Hartford and State of Connecticut, have invented Improvements in Automatic Gum-Feeding Devices, of which the following is a specification.

Our invention relates to gum feeding devices for envelope and analogous machines, and the objects are first, to provide a device of this character which will be automatic in its action; second, to provide a construction in which the supply of gum in the gum box may be kept constant; third, to so construct the box as to avoid the danger of overflowing, and to prevent the gum from being deposited on the working parts of the machine, or envelope blanks, or other blanks, upon which it is desired to place a sealing strip of gum; fourth, to provide an automatic feeding device which can be readily adjusted according to the amount of gum needed to supply the gumming rolls, or gum applying devices, of the machine; and lastly, to avoid the necessity of stopping the machine in order to renew the supply of the gum in the box.

With these objects in view, our invention consists in the novel construction and in the details thereof as hereinafter described and claimed and illustrated in the accompanying drawings, in which—

Figure 1 is a rear elevation, partly sectional, with one side of the gum box removed. Fig. 2 is a top plan view of the gum box. Fig. 3 is a vertical section, on the line 3 3, Fig. 1. Figs. 4, 5, and 6 are details to be hereinafter described.

Referring now to the drawings, A, indicates a portion of the side frames of the machine to which our gum feeding device is applied.

B, is the gum box which is preferably of the form shown, consisting of the bottom and side walls at one end of which are suitable bearings for the feed rolls, X, Y. The roll, X, is mounted upon the shaft, T, which extends longitudinally of the box and is provided at one end with a grooved wheel or pulley, E, having notches *e* in its flanges for a purpose presently to be described. Upon the other end of the shaft, T, is a pinion, V, which is adapted to mesh with a gear upon the machine for driving the said shaft. Of course any suitable means of transmitting motion from the machine to the feed roll shaft may be employed, the pinion being shown merely for the purpose of illustrating a convenient means for this purpose.

Upon the outer end of the shaft, T, is loosely mounted a hand wheel, R, to the hub of which is attached a suitable clutch adapted to engage with a similar clutch on the hub of the pinion, V. This hand wheel is for the purpose of starting the feeder in case the gum becomes hardened after discontinued use. At one end of the gum box is an aperture, L, around which extends upwardly within the box, a dam, F, for the purpose of keeping the gum in the box at a constant level.

Extending downwardly from the bottom of the box, and aligning with this aperture, is a pipe forming a tubular well, D, having its upper end journaled in a tubular bearing, O, carried by a suitable bracket, C, secured to the frame, A, and having its lower end submerged in a suitable reservoir, K, of any desired form, preferably disconnected from the well, as shown in which the supply of gum is maintained. By this construction, the gum box is pivotally supported upon the bracket, C, so that the whole device may be readily swung away from the machine when desired.

Journaled in the lower end of the well, D, is an idler, E', flanged, if desired, like the pulley, E, on the end of the shaft, T, and passing around these two wheels is a belt, U, preferably in the form of a cord of some flexible material, which is adapted to convey gum from the reservoir through the well up around the wheel, E.

Extending longitudinally of the gum box is a partition, *p*, at one end of which is a vertical post or lug, G. This partition, *p*, it will be observed, forms a division between the fresh gum brought up by the conveyer and that which is scraped off the feeding rolls. The excess of gum scraped off the feeding rolls by the scraper, Q, becomes foamy and the air bubbles thus formed should be removed before the gum comes in contact again with the feeding roll. By so dividing the box with this partition, this foamy gum is caused to flow from the scraper down the channel made by the partition, *p*, and the side of the box to the well, thus giving time for the air to leave the gum before it again reaches the rolls.

Mounted upon the partition, in line with the wheel, E, is a scraper, S, preferably made of sheet metal and constructed as shown in Figs. 2 and 5, where it will be seen that it consists of a flat leaf, *g*, extending from the body portion, *f*, from the latter of which strips, *i*, are bent downwardly so as to fit over the partition wall, *p;* and a horizontally projecting portion, *h*, between these two strips, is provided with a slot or recess through which the set screw, W, passes and engages with a screw threaded socket in the top of the post, G.

The free end of the leaf, *g*, is cut out to conform to the contour of the belt cord and the flanged wheel, E, so that the scraper may be adjusted in more or less close contact with these parts. The wheel E is provided with the notches, *e*, for the purpose of allowing the gum to flow out under the cord, U, and also to prevent the said cord from slipping on the wheel.

Referring to Figs. 1, 2, and 3, it will be seen that the feeding roll, X, is mounted upon the shaft, T, rotating in bushings T', so as to revolve with its lower portion submerged in the gum while it transfers the gum thus taken up to the feed roll, Y, which is journaled upon a shaft suspended by links, M, pivotally connected to the upper ends of the brackets or arms, N, that are sleeved upon the shaft, T, and secured by bolts, or suitable fastening means, to the walls of the gum box. These arms, N, project upwardly, at an angle to the vertical, so as to permit the roller, Y, to extend over the side of the box, in order that it may rotate in contact with the rolls carrying the gumming strips of the machine.

Pivotally supported upon the side of the box, B, is a plate, Q, having an ear, *q*, with which a set screw, Z, engages for the purpose of adjusting the said plate with reference to the roll, X, against the hubs of which latter roll the inner free end of the plate is adapted to bear, thereby preventing gum from spreading upon the bearings of the device.

From the foregoing description, it will be seen that as the shaft, T, rotates, the gum will be carried by the belt or cord, U, up through the well, D, and as it comes in contact with the scraper, S, it will be scraped off flowing downwardly on the under side of the leaf, *g*, into the gum box. The amount of gum removed by the scraper and diverted into the gum box will depend upon the distance which the scraping edge of the scraper, S, is from the belt and wheel, which distance is regulated by the set screw, W, that raises or lowers the scraper vertically. The gum carried up by the conveying belt or cord will flow into the reservoir, as described, and will fill the same up to the top of the dam, F, and the feed rollers, X, Y, will transfer the gum from the reservoir to the proper gumming device upon the machine. When the gum is being fed into the gum box from the reservoir faster than it is used by the machine, the surplus will flow over the dam, F, down through the well into the reservoir, and, in order to regulate the amount of gum brought from the reservoir to correspond with the amount utilized by the machine, it is only necessary to adjust the scraper, S, in the manner heretofore described.

While we have shown the well as tubular in form, it is to be understood that any suitable form may be used for this purpose but whatever form may be adopted, it is preferable to provide a tubular portion at the top as a bearing upon which the gum box may be swung out of the way of the machine. The well may also extend at any angle to the bottom of the gum box, according to the position of the reservoir with respect to the said box, since it is obvious that the direction in which this well extends is immaterial so long as it leads to an external source of gum supply. It is also to be understood that various changes may be made in the detail of the construction of the belt conveyer, the scraper, and of the form of the gum box without departing from our invention, the construction shown, simply being that which is now considered to be the preferable form for carrying out our invention.

From the foregoing description, it is plain that the advantages derived from our construction are important and among those may be mentioned the fact that, by providing means for keeping the supply in the gum box constant, we avoid any excess of gum on the feed rolls, and also the possibility of these rolls running dry; and by providing means for returning any excess gum immediately to the reservoir, we avoid the possibility of the gum box overflowing and depositing gum on the working parts of the machine or blanks that are to be gummed. Furthermore, our device is entirely automatic in action after it has been adjusted for the amount of gum required, and it is not necessary to stop the machine in order to renew the supply of gum in the box, while the mechanical parts are exceedingly simple and easy of construction, making the device as a whole durable and easy to repair whenever such repair should be needed.

We claim as our invention—

1. In a gum feeding device, the combination with the gum box, of a disconnected external reservoir, a well projecting downwardly from an aperture in the bottom of the gum box and having its end submerged in the gum in said reservoir, and means for conveying gum from the reservoir to the box, through said well, the latter also serving to return the excess gum from the box to the reservoir, substantially as described.

2. In a gum feeding device, the combination with the gum box, of the shaft mounted on the box, a conveyer operated by the shaft and extending downwardly through an aperture in the bottom of said box, a disconnected external reservoir into which the lower end of said conveyer is submerged, the excess gum from the box being returned to the said reservoir through the aperture, substantially as described.

3. In a gum feeding device, a gum box having side walls and bottom forming a receptacle for gum, an aperture in the bottom of said box and a dam extending around said aperture below the top of the gum box, in combination with an external reservoir, and means for carrying gum to said box from the reservoir, whereby a constant level may be maintained in said box below the top thereof and excess gum returned from the said box to the reservoir through the same aperture by which it passes to the box, substantially as described.

4. In a gum feeding device, the combination with the gum box provided with an aperture in its bottom, a well extending downwardly from said aperture, a disconnected external reservoir in which the lower end of said well is submerged above the bottom thereof, a belt conveyer operating in said well to carry gum through said aperture to the gum box, and a scraper at the upper end of said conveyer, adapted to divert the gum from said conveyer into the gum box, substantially as described.

5. In a gum feeding device, the combination with the gum box, an external reservoir, means for carrying gum from said reservoir to the box, the feed rolls journaled in said box, the scraper for removing excess gum from said feed roll, a partition dividing the box into two channels so that excess gum may be caused to pass around said partition before it is taken up by the feed rolls, substantially as described.

6. In a gum feeding device, the combination with the gum box, of the conveyer for carrying gum from an external reservoir to said box, and a scraper plate mounted in front of the conveyer above the bottom of said box with its scraping edge in the line of travel of the said conveyer, and means for adjusting said plate vertically, at different fixed distances from said conveyer whereby the amount of gum diverted from said conveyer by the scraper may be regulated, substantially as described.

7. In a gum feeding device, the combination with the gum box, of the conveyer passing through the bottom of said box and having its lower end submerged in an external reservoir, the scraper supported by the box and adapted to remove the gum from said conveyer and consisting of a body portion and a leaf projecting therefrom in the line of travel of the conveyer, and a horizontally projecting portion, with means engaging said horizontal portion for vertically adjusting the scraper, substantially as described.

8. In a gum feeding device, the combination with the gum box having a vertical partition therein, and the conveyer, of the scraper plate mounted upon said partition in front of the conveyer, and having its scraping edge so located with respect to said conveyer as to divert the gum therefrom to the box, and the feed rolls with the plate mounted in front of the rolls to remove the excess gum and cause it to pass between the partition and the side of the box, substantially as described.

9. The combination with the gum box having the vertical partition therein, and the cord conveyer, of the scraper consisting of the body portion, $f$, from which the scraper leaf, $g$, projects, the horizontal extension, $h$, the side strips, $i$, bent downwardly to overlap the partition in the box, whereby said scraper is adjustable vertically upon said partition, substantially as and for the purpose set forth.

10. The combination with the frame of an envelop or analogous machine, and the gum box, feed roll shaft and feed rolls journaled thereon, of the well having a journal at its upper end and extending from the bottom of said box to an external reservoir, the bracket fixed to the frame of the machine and having a journal bearing at its outer end through which the said well extends, whereby the whole feeding device may be swung out of the way of the machine, substantially as described.

In testimony whereof we have signed our names to this specification in the presence of two subscribing witnesses.

HENRY B. COOLEY.
    JOHN M. NOBLE.
    JAMES E. TREVOR.

Witnesses:
 ALBERT M. GRAY,
 JOHN DANBY.